United States Patent [19]
Benda

[11] Patent Number: 5,823,020
[45] Date of Patent: Oct. 20, 1998

[54] CABLE LOCKING SYSTEM

[75] Inventor: Steven J. Benda, Cokato, Minn.

[73] Assignee: Brady USA, Inc., Milwaukee, Wis.

[21] Appl. No.: 644,026

[22] Filed: May 9, 1996

[51] Int. Cl.[6] .................................................. E05B 73/00
[52] U.S. Cl. ..................... 70/18; 70/19; 70/58; 24/132 R
[58] Field of Search .................................... 70/18, 19, 30, 70/45, 58; 254/250, 251, 256; 24/132 R

[56] References Cited

U.S. PATENT DOCUMENTS

| | | | |
|---|---|---|---|
| 2,087,420 | 7/1937 | Wiederholt | 24/132 |
| 2,190,661 | 2/1940 | Hauer | 70/49 |
| 3,801,952 | 4/1974 | Lawlor | 24/132 |
| 3,990,129 | 11/1976 | Cronell | 24/132 |
| 4,126,918 | 11/1978 | Cronell | 24/132 |
| 5,070,712 | 12/1991 | Fox | 70/18 |
| 5,440,789 | 8/1995 | Lofland | 24/132 |
| 5,517,835 | 5/1996 | Smith | 70/18 |

FOREIGN PATENT DOCUMENTS

| | | | |
|---|---|---|---|
| 1742556 | 6/1992 | U.S.S.R. | 24/132 |
| 154815 | 12/1920 | United Kingdom | 70/49 |

*Primary Examiner*—Flemming Saether
*Attorney, Agent, or Firm*—Quarles & Brady

[57] ABSTRACT

A cable locking device for use with a flexible cable, the device including a handle member and a trigger member that pivot about a pivot axis. The trigger member forms a channel that extends through and perpendicular to the pivot axis and the handle member forms two other channels, one on either side of the trigger member channel, all of the channels concentric when the device is in an open position. One end of the cable is securable to the handle member and the other end can be fed through the channels, the cable being moved in either direction through the channels to increase or decrease the length of the cable forming a locking loop. The apparatus can be moved from the open position to a locked position thereby misaligning the trigger member channel and the handle member channels to clamp the cable so as to limit movement of the cable through the channels. Once in a locked position, the handle and trigger member can be secured.

28 Claims, 3 Drawing Sheets

CABLE LOCKING SYSTEM

FIELD OF THE INVENTION

The present invention relates to cable locks, and more particularly to a reusable cable lock that allows the length of a locking cable loop to be adjusted to accommodate various applications.

DESCRIPTION OF THE ART

It is often desirable to secure various components of an apparatus in a single locked orientation. For example, many factories will include a plurality of large gate valves for controlling high pressure fluid or gas. Manufacturing processes may require ON, OFF, or partially ON gate valves and, improperly adjusted valves may either damage or destroy factory machinery, adversely affect manufacturing processes, or cause safety problems.

Other applications where apparatus are advantageously locked in a single orientation include vehicle steering wheels while vehicles are parked, large circuit breakers and cylindrical gas tanks that are often stored in factories, hospitals and restaurants, to name a few.

In each of these applications, it is important that a locking mechanism (1) can tightly secure each apparatus in a single locked orientation so that apparatus movement is greatly reduced, (2) is versatile so that it can accommodate various physical sizes and geometric layouts (e.g. valves come in many different sizes and geometries thus requiring various size mechanisms), and (3) is reusable so that the apparatus can be locked and unlocked often to facilitate reorientation, relocking and movement of the apparatus when required.

To accommodate these needs, the industry has devised various locking mechanisms. However, while each of the mechanisms designed may satisfy some of the aforementioned criteria, none satisfactorily meets all of the criteria. For example, one present technique used to secure gate valves is to string a chain through the webbing of a valve handle and about a pipe that houses the valve. A lock is used to secure the chain ends. This technique is advantageous because the lock and chain can be used with various valve sizes and are reusable. Unfortunately, with this technique there is often a significant amount of chain slack allowing some degree of valve handle rotation.

Other techniques include a cable and a locking mechanism whereby one cable end is secured to the mechanism and the other cable end can be pulled through the mechanism in one direction to tighten the cable forming a loop. Mechanisms using this technique can provide a tight locking loop and, because a long cable can be provided to accommodate any size requirements, these mechanisms are versatile. However, these mechanisms cannot be unlocked to facilitate reorientation and relocking of an apparatus (i.e., these mechanisms can only be tightened, not loosened).

Still other techniques include a locking mechanism and a cable wherein fittings are permanently attached to the cable and are received by the mechanism to lock the cable. These mechanisms, like the chain mechanism above, cannot provide all sizes of tight locking loops.

Thus, it would be advantageous to have a reusable cable locking mechanism that can be used to lock various apparatus types with a tight cable loop in a single orientation so as to facilitate repetitive and secure locking and unlocking.

SUMMARY OF THE INVENTION

The present invention includes a locking mechanism that can secure a cable in a locked loop of any required length. In addition, the present locking mechanism can be locked and unlocked repetitively to facilitate reorientation or movement of an apparatus, thus making the mechanism versatile, effective and reusable.

The inventive mechanism includes a clamping apparatus for securing a first end of a cable and a cable section. The apparatus includes a handle member including integrally connected head and neck portions wherein the head portion forms a first channel. A trigger member includes proximal and distal ends, the proximal end forming a second channel. Proximate edges of the first and second channels are cable securing edges. The members are pivotally connected at the head portion and proximate end for movement between an open position wherein the first and second channels are substantially aligned and adjacent, and a closed position wherein the first and second channels are misaligned.

In a preferred embodiment, the trigger member is moved toward the handle member when the members are moved from the open position to the closed position. A securing means is provided to maintain the members in the closed position. A fastener is connected to the handle member and the first cable end is receivable and securable by the fastener. A biasing means, preferably a spring, biases the members toward the open position.

With the members in the open position, the cable segment can be positioned within the channels so that a securing section is proximate the cable securing edges. With the segment so positioned, the members can be rotated into the closed position misaligning the channels. With the channels misaligned, the securing section is axially compressed between the misaligned cable securing edges such that cable movement along the channels is prohibited.

One object of the invention is to provide a locking device that can provide a cable locking loop of any required size to accommodate various locking requirements. With one end of a cable secured by the device, any other segment of the cable can be positioned and secured within the channels to provide a locking loop of virtually any required size.

Preferably, the apparatus further includes a cylindrical stainless steel locking sleeve positioned within the first channel, one edge of the sleeve forming the first channel cable securing edge. In addition, it is preferable that the members be formed of a rigid synthetic resin.

Another object of the invention is to provide a device that can be formed primarily of an inexpensive plastic resin that will still provide a hard cable securing edge for clamping and securing a cable. The cable securing edge and adjacent portion of the channel can be formed of steel while the larger trigger and handle portions are formed of inexpensive resin.

In one aspect the first channel includes anterior and posterior channels positioned on opposite sides of the second channel, both the anterior and posterior channels aligned with the second channel when the members are in the open position and misaligned when the members are in the closed position. When constructed in this manner, the apparatus advantageously provides two pairs of cable securing edges that further ensure a locked cable segment. Where anterior and posterior channels are provided, preferably the apparatus includes two cylindrical locking sleeves, one sleeve positioned within the anterior channel and the other sleeve positioned within the posterior channel, each of the sleeves forming a cable securing edge.

Each cable securing edge is characterized by a central axis which is perpendicular to a plane of the cable securing edge. Proximate cable securing edges have aligned central axes when the members are in the open position and have axes that are misaligned by approximately 23° when the members are in the closed position.

Yet another object of the invention is to facilitate effective cable clamping without damaging the cable. Where the misalignment of central axes is insufficient, the cable may tend to slip. However, where misalignment is excessive, cable geometry could be altered if the cable strands are crushed, thus making it difficult to move the altered cable segment through the device channels. It has been found that a closed position wherein the misalignment angle is approximately 23° is sufficient to lock a cable under normal conditions and will not alter cable geometry.

Preferably, the members pivot in a pivot plane and each member forms an aperture substantially perpendicular to the pivot plane wherein the apertures align when the members are in the closed position. Here, the securing means may include a conventional padlock wherein a "U-shaped" lock shaft extends through the aligned apertures.

Thus, another object of the invention is to provide a device that can be locked and unlocked easily so that the device can be used repetitively. To lock the present device, the desired cable segment is positioned within the channel and the members are pivoted into the clamping position with the apertures aligned. Then, the shaft is placed through the apertures to maintain clamped orientation. To unlock the device, the shaft is simply removed from the apertures. When the shaft is removed, resilient properties of the cable and the biasing means act together to force the channels to realign at which point the cable can be removed from the channel.

Other and further aspects and objects of the present invention will become apparent during the course of the following description and by reference to the accompanying drawings.

DETAILED DESCRIPTION OF THE PREFERRED EMBODIMENT

Figure 1:
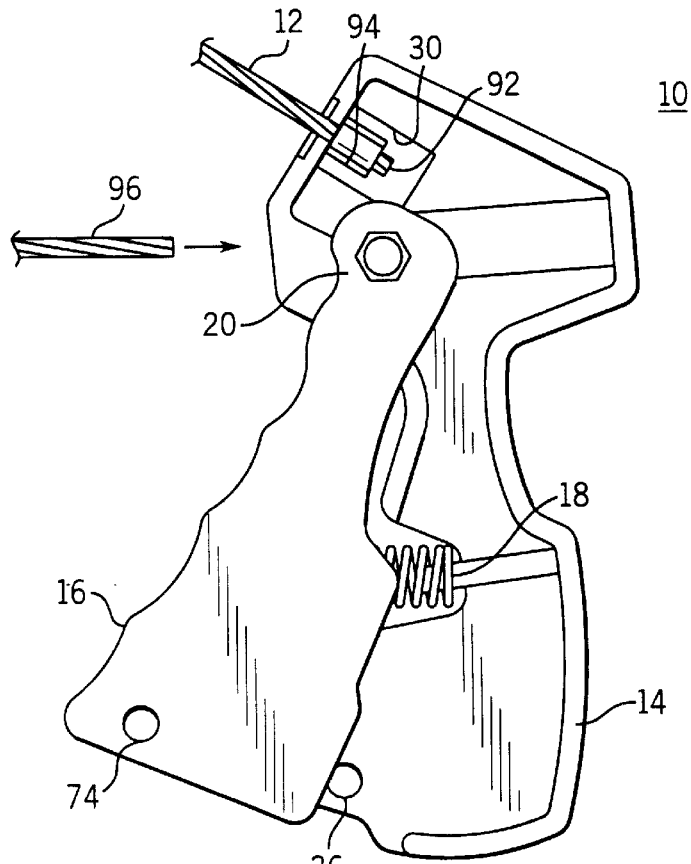
FIG. 1 is a perspective view of a clamp device according to the present invention.

Referring now to FIG. 1, the inventive clamping device 10 can be used to clamp together first and second ends 92, 96 of a cable 12 or one end of a cable and any segment of that cable. Referring also to FIGS. 2A through 8, the device comprises six components including a handle member 14, a trigger member 16, a conventional helical spring 18, a locking cog 20 and anterior and posterior stainless steel sleeves 22, 24, respectively.

Figure 2A:
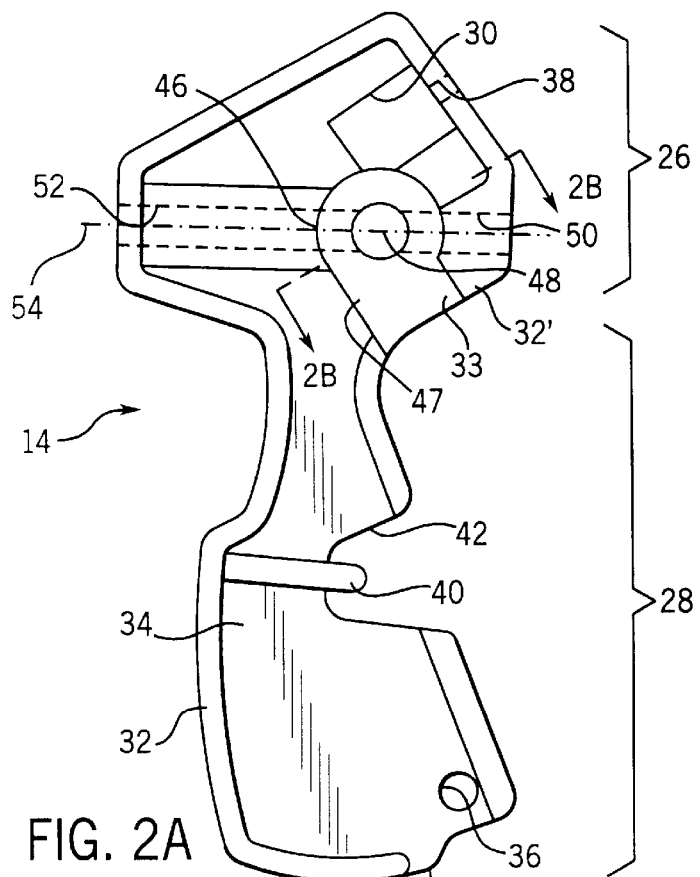
FIG. 2A is a plan view of the handle member shown in FIG. 1.
Figure 2B:
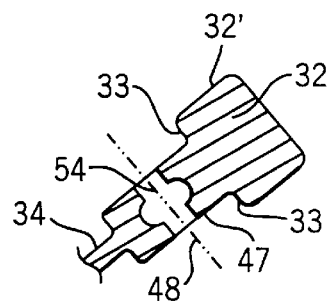
FIG. 2B is a cross sectional view of FIG. 2A taken along the line 2B—2B.

Referring specifically to FIG. 2A, the handle member 14 includes a head portion 26 and a neck portion 28 that extends downwardly from the head portion 26. Referring also to FIG. 2B, both the head and neck portions 26, 28 are formed having an external skeletal rib structure 32 and webbing 34 that substantially fills in the space between the rib structure 32. The rib structure 32 is substantially wider than the webbing 34 and offers support thereto. The webbing 34 forms a locking aperture 36 near the lower distal end of the neck portion 28 and a fastening aperture 30 near the top of the head portion 26. The fastening aperture 30 is positioned proximate a section of the rib structure 32 and an aperture 38 passes through an adjacent portion of the rib structure 32 to allow access to the fastening aperture 30 through the rib structure 32.

The rib structure 32 is discontinuous at first and second break points 42, 44. The second break point 44 is near the lower distal end of the neck portion 28 below the locking aperture 36. The first break point 42 is approximately halfway between the head portion 26 and the second break point 44, and, in the preferred embodiment, is located on the same side of the handle member 14 as the fastening aperture 30. The handle member 14 also forms a first cylindrical mounting extension 40 approximately centrally located in the first break point 42 which extends outwardly away from the handle member 14.

The handle member 14 also forms a cog support 47 that is wider than the webbing 34 but not as wide as the rib structure 32. Adjacent the cog support 47, a special portion of the rib structure 32 forms a pivot stop 32' having a first pivot stop wall 33 on either side of the cog support 47. The pivot stop wall 33 limits trigger member 16 movement as will be explained in more detail below.

A cog aperture 46 about a cog axis 48 is centrally located in the cog support 47 just under the fastening aperture 30. In addition, the head portion 26 forms concentric anterior and posterior channels 50, 52 that are perpendicular to the cog aperture 46 and that have a channel axis 54 that intersects the cog axis 48.

Figure 3A:
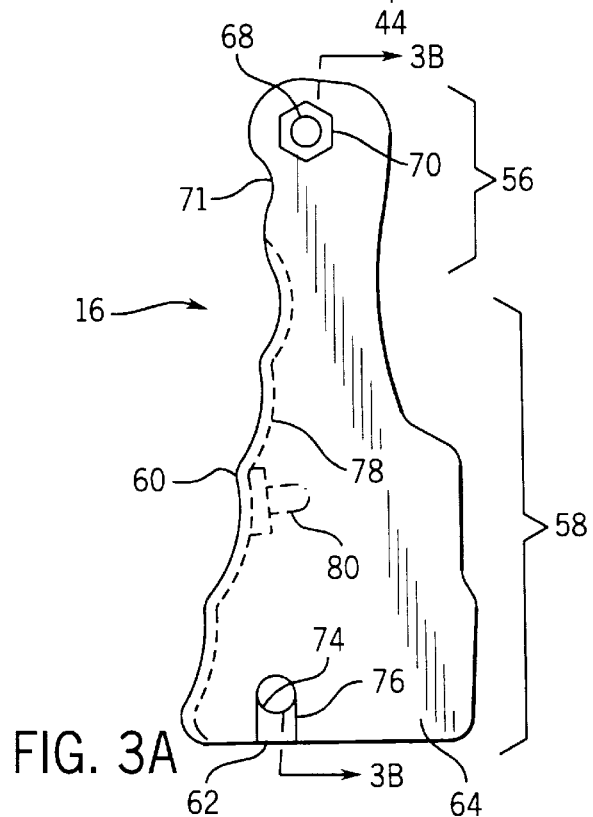
FIG. 3A is a plan view of the trigger member shown in FIG. 1.
Figure 3B:
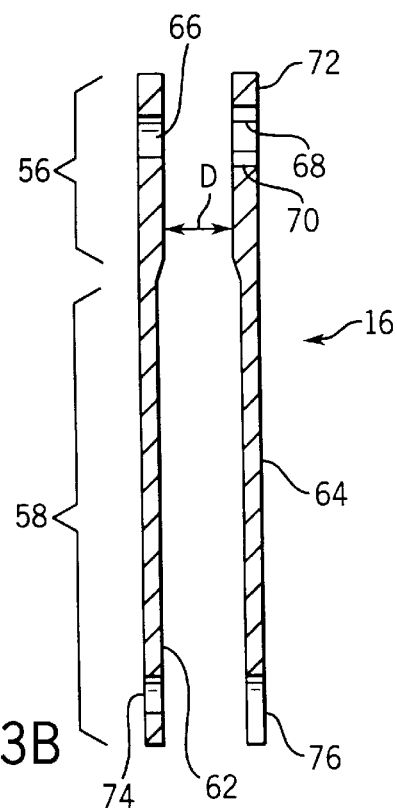
FIG. 3B is a cross-sectional view taken along the line 3B—3B of FIG. 3A.

Referring now to FIG. 3A, the trigger member 16 includes a proximal upper section 56 and a distal lower section 58. Referring also to FIG. 3B, the distal section 58 is formed of a trigger wall 60 and two parallel and facing lateral walls 62, 64. The proximal section 56 is formed by the two lateral walls 62, 64 which extend upwardly above the trigger wall 60. Referring also to FIG. 3B, the lateral walls 62, 64 are formed so that a space D therebetween is identical to the width of the cog support 47.

The upper portions of the lateral walls 62, 64 that form the proximal upper section 56 form concentric apertures 66, 68, respectively. In addition, the second 64 of the two lateral walls, also forms a keyed recess 70 on an outside surface 72 thereof about aperture 68. In a preferred embodiment the keyed recess 70 has a hexagonal shape.

The lower portion of the first lateral wall 62 forms an aperture 74 while the lower portion of the second lateral wall 64 forms a "U-shaped" channel 76 having an arcuate portion that is concentric with aperture 74.

Referring still to FIG. 3A, a second mounting extension 80 which is located approximately halfway between the proximal section 56 and aperture 74 extends outwardly from an internal surface 78 of the trigger wall 60. Each of the upper sections of lateral walls 62, 64 forms a second pivot stop wall 71.

Figure 7:
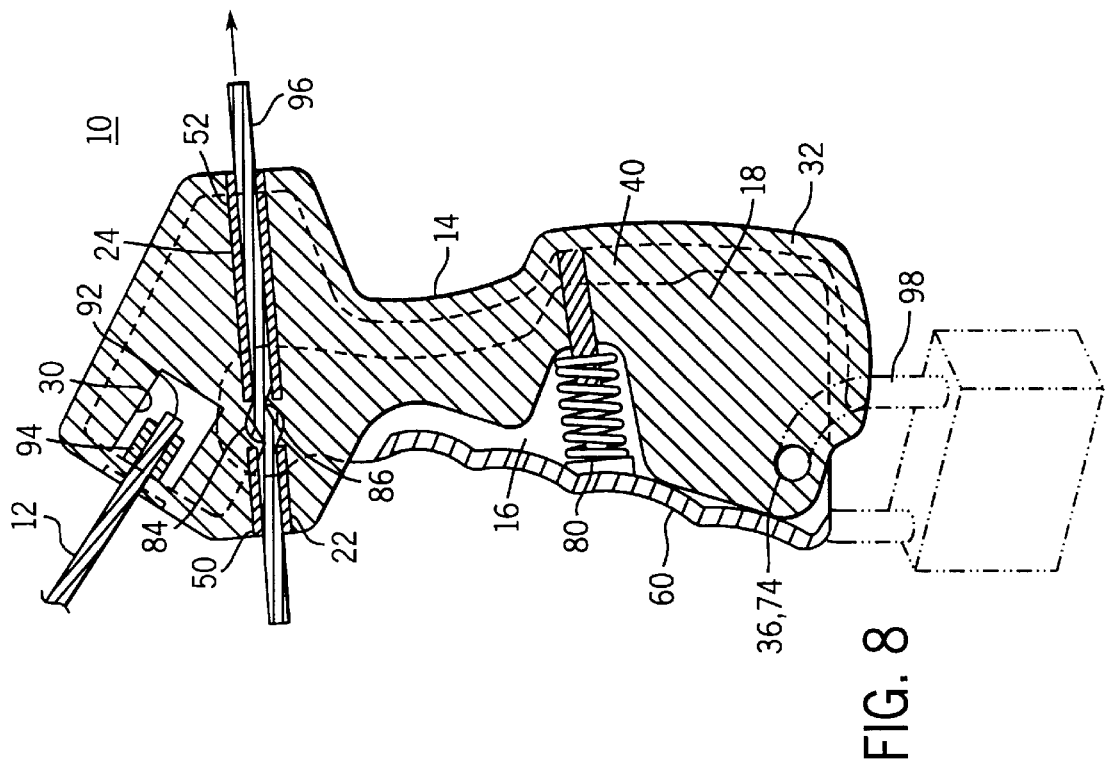
FIG. 7 is a cross-sectional view of the clamp device of FIG. 1 in a open position.

Referring to FIG. 7, the helical spring 18 should be sized so as to receive each of the mounting extensions 40, 80 in an adjacent end when the device 10 is assembled.

Figure 4A:
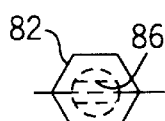
FIG. 4A is an end view of a locking cog used with the clamp device in FIG. 1.
Figure 4B:
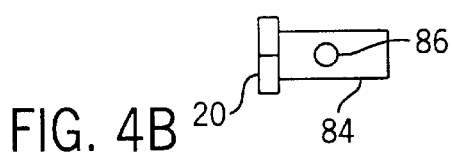
FIG. 4B is a plan view of the locking cog of FIG. 4A.

Referring to FIGS. 4A and 4B, the locking cog 20 resembles a bolt having a hexagonal head 82 and an integrally attached unthreaded neck portion 84 that extends therefrom. The neck portion 84 forms an aperture 86 (or second channel) that extends therethrough perpendicular to the length of the neck portion 84. The channel 86 should be sized so that a cable 12 to be used with the clamping device 10 can easily fit therethrough. Referring still to FIG. 4A, the channel 86 is shown to be aligned with two of the points on the keyed hexagonal head 82. Referring also to FIG. 3A, the shape of the head 82 should be identical to the shape of the keyed recess 70.

Figure 5:
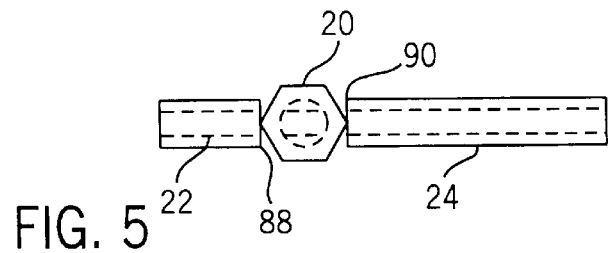
FIG. 5 is a plan view of various components of the clamp device of FIG. 1 in the open position.

Referring to FIG. 5, preferably, the device 10 includes both anterior and posterior sleeves 22, 24. Most preferably the sleeves 22, 24 are cylindrical stainless steel sleeves. The sleeves 22, 24 should be sized so as to fit tightly within the anterior and posterior channels 50, 52 and their internal dimensions should be wide enough that the cable 12 can easily pass therethrough. Each sleeve 22, 24 forms a cable securing edge 88, 90 respectively.

Referring now to FIGS. 1 and 7, to assemble the preferred device 10, the anterior and posterior sleeves 22, 24 are securely positioned inside the anterior and posterior channels 50, 52 in any manner known in the art. When properly positioned, the cable securing edges 88, 90 should be adjacent the internal surface of aperture 46. Next, the spring 18 can be positioned so as to receive both the first and second mounting extensions 40, 80, respectively, one mounting extension in either end of the spring 18. The spring 18 can then be compressed and the proximal section 56 of the trigger member 16 can be forced into a position where the apertures 66, 68 are concentrically aligned with cog aperture 46. In this position, an upper portion of each lateral wall 62, 64 should be on either side of the cog support 47 and the first pivot stop walls 33 should make full contact with the second pivot stop walls 71 (see also FIGS. 2A and 3A). The pivot stop walls 33 and 71 together should limit movement of the trigger member 16 away from handle member 14. At this time two points of the hexagonal keyed recess 70 should define a line that is parallel to the channel axis 54.

With apertures 66, 68 and cog aperture 46 aligned, the locking cog 20 can be positioned so that its neck 84 extends through apertures 68, 46 and 66, channel 86 is aligned with the anterior 50 and posterior 52 channels and the hexagonal head 82 is securely received within the keyed recess 70.

At this point, all device 10 components have been assembled. Referring again to FIGS. 1, 7 and 8, to fasten the first end 92 of the cable 12 to the device 10, a cylindrical fitting 94 having an outer diameter which is greater than the diameter of aperture 38, is compressed onto the first end 92. Next, the second end 96 is strung into the fastening aperture 30 and through aperture 38 until the fitting 94 abuts the rib structure 32 inside the fastening aperture 30.

Figure 8:
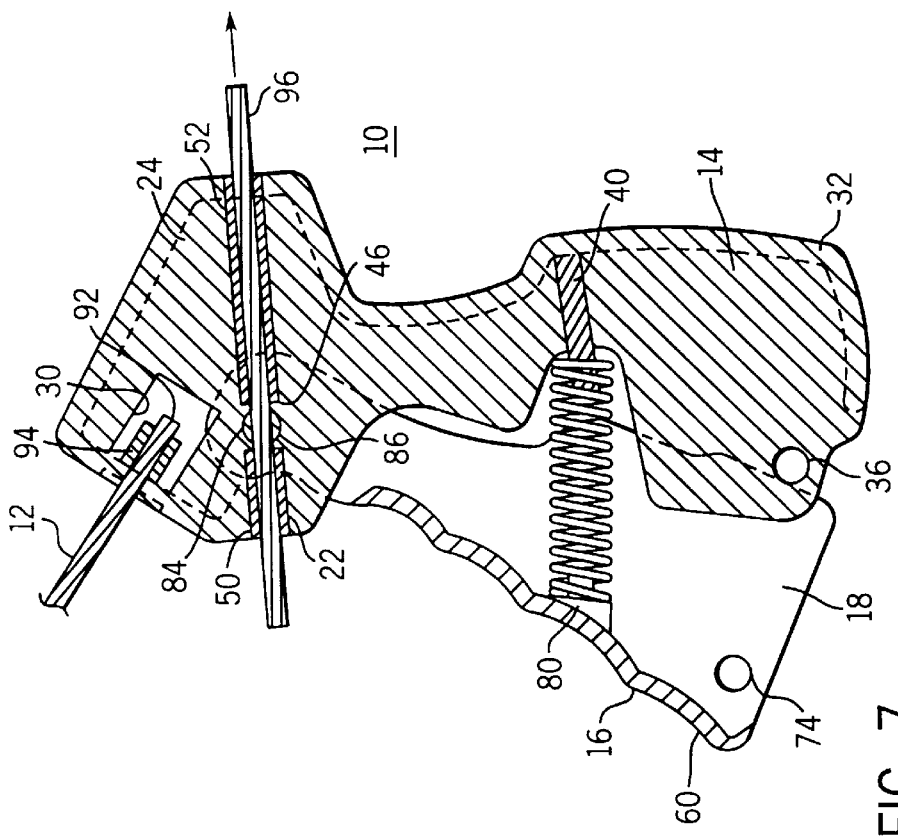
FIG. 8 is a cross-sectional view of the clamp device of FIG. 1 in a closed position.

When the inventive device 10 is to be used to clamp the cable 12 to form a secure locking loop, the second end 96 is strung through the anterior, cog and posterior channels 50, 86, 52 and extends out of the device 10 as shown in FIGS. 7 and 8. In FIG. 7, the device 10 is shown in an open position wherein the anterior and posterior channels 50, 52 are aligned with cog channel 86 so that the cable 12 can easily be moved through the device 10 to either tighten or loosen the cable loop.

Once the cable 12 has been pulled through the anterior, posterior and cog channels 50, 52, 86 so that cable tension is sufficient, to lock the cable so that it cannot move through the device 10, an operator simply forces the trigger member 16 and handle 14 together against the spring force so that the trigger member 16 pivots about the cog access 48. To facilitate easy moving, the handle 14 and trigger 16 members are formed so as to be easily gripped by a hand (i.e., the handle member is shaped like the butt of a gun and the trigger member is shaped to accommodate four fingers). In this way, a user can pull the cable 12 through the device 10 with one hand and move the handle 14 and trigger 16 members from the open position in FIG. 7 to the closed position in FIG. 8 with the other hand.

Referring now to FIG. 8, when the members 14, 16 are moved into the closed position, because the head 82 of the locking cog 20 is keyed to fit tightly within the recess 70, the cog rotates along with the trigger member -16, thus misaligning the cog channel 86 and anterior and posterior channels 50, 52. When this is done, the cable securing edges 88, 90 of the sleeves 22, 24, and the cog channel 86 cooperate to place the cable segment within the device 10 in a bent non-linear orientation, thus securing the cable between the cable securing edges and hampering cable movement through the device 10.

Referring still to FIG. 8, when the handle 14 and trigger 16 members are in the closed position, the apertures 36, 74 (and 76) are aligned. To lock the members 14, 16 in the closed position, a padlock shaft 98 can be placed through the apertures 36, 74, 76 and the pad lock can be locked. Then, after the handle 14 and trigger 16 members are released, the shaft 98 will maintain the device in the closed position shown in FIG. 8 locking the cable loop.

Figure 6:
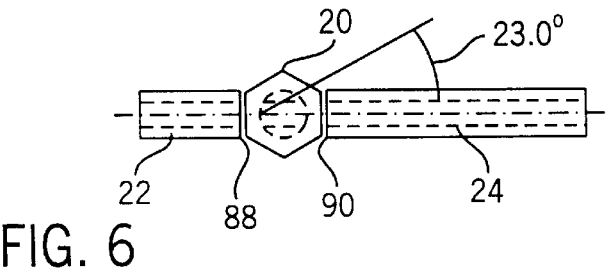
FIG. 6 is similar to FIG. 5 except that the components are in a preferred closed position.

Referring to FIG. 6, in the preferred embodiment, the angle through which the locking cog 20 rotates when the trigger member 16 is rotated from the open position in FIG. 7 to the closed position in FIG. 8 is approximately 23°. Through experimentation, it has been found that this angle provides sufficient securing action at the cable securing edges 88, 90 to stop movement of the cable through the device and at the same time will not appreciably change cable geometry.

In addition to the components discussed above, it is advantageous to provide a cover sheath (not shown) to cover the head portion 26 of the handle member 14 so that mechanical components therein are shielded. Nevertheless, it should be noted that, once a cable has been locked into the device 10 as described above, without removing the shaft 98 or destroying the device, it is not possible to disassemble the device 10 (without damaging the device), even where no cover sheath is provided (i.e., the cog 20 secures the cable 12 and the cable 12 likewise secures the cog 12).

While the securing sections of the device 10, which include the locking cog 20 and the sleeves 22, 24, should be formed of a rigid material (preferably stainless steel although other rigid and substantially unyielding materials might be suitable), the trigger 16 and handle 14 members are preferably formed of a strong, lightweight and rigid plastic resin material to reduce device weight and cost.

It should be understood that the methods and apparatus as described above are only examples and do not limit the scope of the invention and that various modifications could be made by those skilled in the art that fall under the scope of the invention. For example, while the device is shown as being in an open position when the spring 18 is expanded and a locked position when the spring 18 is compressed, the invention further includes embodiments wherein the device is released when the spring is compressed and is clamped when the spring is expanded. This can be accomplished by simply changing the orientation of channel 86 so that, upon compressing the trigger 16 and handle 14 members, channels 50, 52 and 86 are aligned.

In addition, the invention could be practiced wherein the angle through which the locking cog 20 rotates when the trigger member 16 is moved from the released to the closed positions is greater than or less than 23°. For example, the angle could be between 10° and 35°. Which angle or range of angles are most advantageous would depend on cable characteristics and device geometry. For example, where the internal diameter of sleeves 22, 24 is nearly identical to a cable diameter, the minimum workable misalignment angle could be much less than 23°. However, where the internal diameters of the sleeves 22, 24 is much greater than a cable diameter, the minimum workable misalignment angle could be much greater than 23°.

Moreover, a device according to the present invention may include only one of the anterior or posterior channels and associated sleeves. Furthermore, the channels 50, 52 and sleeves 22, 24 need not have linear axis. Instead, each of the channels 50, 52 may have some curvature.

Furthermore, the first end 92 of the cable 12 need not be fastened to the handle member 14. Instead, the first end 92 may be attached to the trigger member 16. It is also clear that the device could operate without a spring 18.

To apprise the public of the scope of this invention, I make the following claims.

I Claim:

1. A clamping apparatus for clamping onto at least one cable section, the apparatus comprising:
   a handle member including integrally connected head and neck portions, the head portion forming a first channel and forming a pivot aperture essentially perpendicular to the first channel;
   a trigger member including proximal and distal ends;
   a pivot Pin securely linked to the proximal ends, extending through the pivot aperture, and forming a second channel adjacent the first channel, proximate edges of the first and second channels being cable securing edges, the pin pivotally linking the proximal end to the head portion for movement between an open position wherein the first and second channels are substantially aligned and adjacent, and a closed position wherein the first and second channels are misaligned; and
   a means for securing the members in the closed position;
   wherein, with the members in the open position, a cable segment is positionable within the channels so that a securing section of the cable is proximate the cable securing edges and, with the cable segment so positioned, the members can be rotated into the closed position misaligning the channels, the cable securing section axially compressed between the misaligned cable securing edges such that cable movement along the channels is prohibited.

2. The apparatus of claim 1 wherein the channels are positioned and the members are connected such that the members are pivoted toward each other to move from the open position to the closed position.

3. The apparatus of claim 2 wherein the cable includes first and second cable ends, the apparatus further including a fastener connected to one of the members, the first cable end being receivable and securable by the fastener.

4. The apparatus of claim 3 wherein the fastener is connected to the handle member.

5. The apparatus of claim 4 wherein the first cable end includes an outwardly extending flange and the fastener includes a hole having a diameter less than the flange but greater than the cable, the cable extending through the hole.

6. The apparatus of claim 2 further including a locking sleeve positioned within the first channel, one edge of the sleeve forming the first channel cable securing edge.

7. The apparatus of claim 6 wherein the locking sleeve is formed of stainless steel.

8. The apparatus of claim 2 wherein the first channel includes anterior and posterior channels positioned on opposite sides of the second channel, both the anterior and posterior channels aligned with the second channel when the members are in the open position and misaligned when the members are in the closed position.

9. The apparatus of claim 8 further including two locking sleeves, one sleeve positioned within the anterior channel and the other sleeve positioned within the posterior channel, each of the sleeves forming a cable securing edge.

10. The apparatus of claim 2 wherein the members are formed of a rigid synthetic resin.

11. The apparatus of claim 2 wherein each cable securing edge is characterized by a central axis which is perpendicular to the plane of the cable securing edge, proximate cable securing edges having aligned central axis when the members are in the open position and having axis that are misaligned by between 15 and 30 degrees when the members are in the closed position.

12. The apparatus of claim 11 wherein the axis are misaligned by approximately 23 degrees.

13. The apparatus of claim 2 further including a biasing means for biasing the members toward the open position.

14. The apparatus of claim 13 wherein each of the members includes a retaining means and the biasing means includes a spring secured by the retaining means between the members.

15. The apparatus of claim 2 wherein the members pivot in a pivot plane and each member forms an aperture substantially perpendicular to the pivot plane, the apertures aligning when the members are in the closed position and the securing means includes a rigid shaft that extends through the apertures.

16. The apparatus of claim 15 wherein the shaft is part of a pad lock.

17. The apparatus of claim 1 wherein the proximal end forms a pin aperture and a keyed recess therearound and the pin includes a bolt having a head shaped like the recess which extends through the pin aperture so that the head is received in the recess.

18. A clamping apparatus for securing a first end of a cable and a cable section, the apparatus comprising:
   a handle member including integrally connected head and neck portions, the head portion forming a first channel and forming a pivot aperture essentially perpendicular to the first channel;
   a trigger member including proximal and distal ends;
   a pivot pin securely linked to the proximal ends, extending through the pivot aperture, and forming a second channel adjacent the first channel, proximate edges of the first and second channels being cable securing edges, the pin pivotally connecting the head portion and proximate end for movement between an open position wherein the first and second channels are substantially aligned and adjacent, and a closed position wherein the first and second channels are misaligned, the trigger member moved toward the handle member when the members are moved from the open position to the closed position;

means for securing the members in the closed position;

a fastener connected to the handle member, the first cable end receivable and securable by the fastener; and a biasing means for biasing the members toward the open position;

wherein, with the members in the open position, the cable segment is positionable within the channels so that a securing section is proximate the cable securing edges and, with the segment so positioned, the members can be rotated into the closed position misaligning the channels, the securing section axially compressed between the misaligned cable securing edges such that cable movement along the channels is prohibited.

19. The apparatus of claim 18 wherein the first channel includes anterior and posterior channels positioned on opposite sides of the second channel, both the anterior and posterior channels aligned with the second channel when the members are in the open position and misaligned when the members are in the closed position.

20. The apparatus of claim 19 further including anterior and posterior locking sleeves positioned within the anterior and posterior channels respectively, locking sleeve edges adjacent the second channel and edges of the second channel forming cable securing edges, the anterior channel cable securing edge and adjacent second channel cable securing edge forming an anterior cable securing edge pair and the posterior channel cable securing edge and adjacent second channel cable securing edge forming a posterior cable securing edge pair.

21. The apparatus of claim 20 wherein the members are formed of a rigid synthetic resin and the sleeves are formed of stainless steel.

22. The apparatus of claim 21 wherein each cable securing edge is characterized by a central axis which is perpendicular to a plane of the cable securing edge, proximate cable securing edges having aligned central axis when the members are in the open position and having axis that are misaligned by substantially 23 degrees when the members are in the closed position.

23. The apparatus of claim 22 wherein the biasing means includes a spring secured between the members.

24. The apparatus of claim 18 wherein the members pivot in parallel pivot planes and each member forms a locking aperture substantially perpendicular to the pivot planes, when the members are in the closed position, overlapping sections of the members are parallel, the locking apertures are aligned and the securing means includes a rigid shaft that extends through the apertures.

25. A clamping apparatus for clamping onto at least one cable section, the apparatus comprising:

a handle member including integrally connected head and neck portions and a first retaining means, the head portion forming a first channel;

a trigger member having proximal and distal ends, the proximal end forming a second channel, proximate edges of the first and second channels being cable securing edges, the proximal end of the trigger member being pivotally mounted to the head portion of the handle member for movement between an open position wherein the first and second channels are substantially aligned and adjacent, and a closed position wherein the first and second channels are misaligned, the trigger member moved toward the handle member when the members are moved from the open position to the closed position; and a means for securing the members in the closed position;

a spring for biasing the members toward the open position, the spring secured between the members by the first and second retaining means;

wherein, with the members in the open position, a cable segment is positionable within the channels so that a securing section of the cable is proximate the cable securing edges and, with the cable segment so positioned, the members can be rotated into the closed position misaligning the channels, the cable securing section axially compressed between the misaligned cable securing edges such that cable movement along the channels is prohibited.

26. A clamping apparatus for clamping onto at least one cable section, the apparatus comprising:

a handle member including integrally connected head and neck portions, the head portion forming a first channel;

a trigger member including proximal and distal ends, the proximal end forming a second channel, proximate edges of the first and second channels being cable securing edges, the proximal end of the trigger member being pivotally mounted to the head portion of the handle member for movement between an open position wherein the first and second channels are substantially aligned and adjacent, and a closed position wherein the first and second channels are misaligned, the trigger member moved toward the handle member when the members are moved from the open position to the closed position; and a rigid shaft which forms part of a padlock, wherein, with the members in the open position, a cable segment is positionable within the channels so that a securing section of the cable is proximate the cable securing edges and, with the cable segment so positioned, the members can be rotated into the closed position misaligning the channels, the cable securing section axially compressed between the misaligned cable securing edges such that cable movement along the channels is prohibited and, wherein the members pivot in a pivot plane and each member forms an aperture substantially perpendicular to the pivot plane, the apertures aligning when the members are in the closed position, the shaft positionable within the apertures.

27. A clamping apparatus for clamping onto at least one cable section, the apparatus comprising:

a handle member including integrally connected head and neck portions and forming a first channel, the head portion forming a pivot aperture substantially perpendicular to the first channel;

a trigger member including proximal and distal ends, the proximal end forming a second channel, proximate edges of the first and second channels being cable securing edges, the proximal end of the trigger member being pivotally mounted to the head portion of the handle member for movement between an open position wherein the first and second channels are substantially aligned and adjacent, and a closed position wherein the first and second channels are misaligned, the trigger member moved toward the handle member when the members are moved from the open position to the closed position, the trigger member also including a pivot pin which extends through the pivot aperture and forms the second channel, wherein the proximal end forms a pin aperture and a keyed recess around the pin aperture and the pin includes a bolt having a head shaped like the keyed recess, the bolt extending through the pin aperture so that the head is received in the recess; and a means for securing the members in the closed position;

wherein, with the members in the open position, a cable segment is positionable within the channels so that a securing section of the cable is proximate the cable securing edges and, with the cable segment so positioned, the members can be rotated into the closed position misaligning the channels, the cable securing section axially compressed between the misaligned cable securing edges such that cable movement along the channels is prohibited.

28. A clamping apparatus for securing a first end of a cable and a cable section, the apparatus comprising:

a handle member including integrally connected head and neck portions, the head portion forming a first channel;

a trigger member including proximal and distal ends, the proximal end forming a second channel, proximate edges of the first and second channels being cable securing edges, the members pivotally connected at the head portion and proximate end for movement between an open position wherein the first and second channels are substantially aligned and adjacent, and a closed position wherein the first and second channels are misaligned, the trigger member moved toward the handle member when the members are moved from the open position to the closed position;

means for securing the members in the closed position;

a fastener connected to the handle member, the first cable end receivable and securable by the fastener; and a biasing means for biasing the members toward the open position;

wherein, with the members in the open position, the cable segment is positionable within the channels so that a securing section is proximate the cable securing edges and, with the segment so positioned, the members can be rotated into the closed position misaligning the channels, the securing section axially compressed between the misaligned cable securing edges such that cable movement along the channels is prohibited and, wherein the members pivot in parallel pivot planes and each member forms a locking aperture substantially perpendicular to the pivot planes, when the members are in the closed position, overlapping sections of the members are parallel, the locking aperture are aligned and the securing means includes a rigid shaft that extends through the apertures.

* * * * *